(12) United States Patent
Chang et al.

(10) Patent No.: US 11,777,821 B2
(45) Date of Patent: Oct. 3, 2023

(54) SYSTEMS AND METHODS FOR PERFORMANCE-AWARE CONTROLLER NODE SELECTION IN HIGH AVAILABILITY CONTAINERIZED ENVIRONMENT

(71) Applicant: Verizon Patent and Licensing Inc., Basking Ridge, NJ (US)

(72) Inventors: Patricia R. Chang, San Ramon, CA (US); Shi-Jau Wang, Sunnyvale, CA (US); Raghu P. Batchu, Cranbury, NJ (US); Mason Ng, Hillsborough, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 81 days.

(21) Appl. No.: 17/402,939

(22) Filed: Aug. 16, 2021

(65) Prior Publication Data
US 2023/0053114 A1   Feb. 16, 2023

(51) Int. Cl.
  *H04L 43/08*    (2022.01)
  *G06F 9/455*   (2018.01)
  *G06F 9/48*    (2006.01)

(52) U.S. Cl.
  CPC .......... *H04L 43/08* (2013.01); *G06F 9/45558* (2013.01); *G06F 9/4881* (2013.01); *G06F 2009/45595* (2013.01)

(58) Field of Classification Search
  CPC ... H04L 43/08; G06F 9/45558; G06F 9/4881; G06F 2009/45595
  See application file for complete search history.

(56) References Cited

U.S. PATENT DOCUMENTS

| | | | |
|---|---|---|---|
| 2012/0151550 A1* | 6/2012 | Zhang | H04N 21/2405 725/148 |
| 2019/0342383 A1* | 11/2019 | Matican | H04L 67/34 |
| 2020/0133793 A1* | 4/2020 | Greenwood | G06F 11/2094 |
| 2020/0310394 A1* | 10/2020 | Wouhaybi | H04L 67/125 |
| 2020/0334113 A1* | 10/2020 | Sanakkayala | G06F 9/45558 |

(Continued)

OTHER PUBLICATIONS

Kubernetes Blog, "Simple Leader Election with Kubernetes and Docker," Jan. 11, 2016 (available at https://kubernetes.io/blog/2016/01/simple-leader-election-with-kubernetes/, visited Jun. 29, 2021).

(Continued)

*Primary Examiner* — Chris Parry
*Assistant Examiner* — Steven C Nguyen

(57) ABSTRACT

Embodiments described herein provide for an election procedure, in a high availability ("HA") environment, for a backup controller to assume operations performed by a master controller in the event that the master controller becomes unreachable. The master controller may be associated with (e.g., provisioned on) the same set of hardware as one or more worker nodes, and may control operation of the one or more worker nodes. The election procedure may be performed based on performance metrics, location, or efficiency metrics associated with candidate backup controllers (e.g., cloud-based backup controllers), including performance of communications between particular backup controllers and the one or more worker nodes.

20 Claims, 14 Drawing Sheets

(56) References Cited

U.S. PATENT DOCUMENTS

2022/0276929 A1* 9/2022 Prashant ............... G06F 9/5077

OTHER PUBLICATIONS

Kubernetes Blog, "Set Up a High Availability etcd Cluster with kubeadm," May 7, 2021 (available at https://kubernetes.io/docs/setup/production-environment/tools/kubeadm/setup-ha-etcd-with-kubeadm/, visited Jun. 29, 2021).

Kubernetes, "Component Tools," (available at https://kubernetes.io/docs/reference/command-line-tools-reference/print/, visited Jun. 30, 2021).

* cited by examiner

SYSTEMS AND METHODS FOR PERFORMANCE-AWARE CONTROLLER NODE SELECTION IN HIGH AVAILABILITY CONTAINERIZED ENVIRONMENT

BACKGROUND

Virtualized computing environments may make use of containers, virtual machines, and/or other types of mechanisms in order to provide homogenous or replicable services in diverse deployment scenarios. Some such environments may make use of high availability ("HA") mechanics, such as containers or nodes that serve as backups for other containers or nodes. When a "main" or "master" container fails (e.g., becomes unreachable, falls below a performance threshold, etc.), a backup may be selected to take its place and resume operations of the failed container, thus maintaining the availability of the container that has failed.

DETAILED DESCRIPTION OF EXAMPLE EMBODIMENTS

Figure 1A:
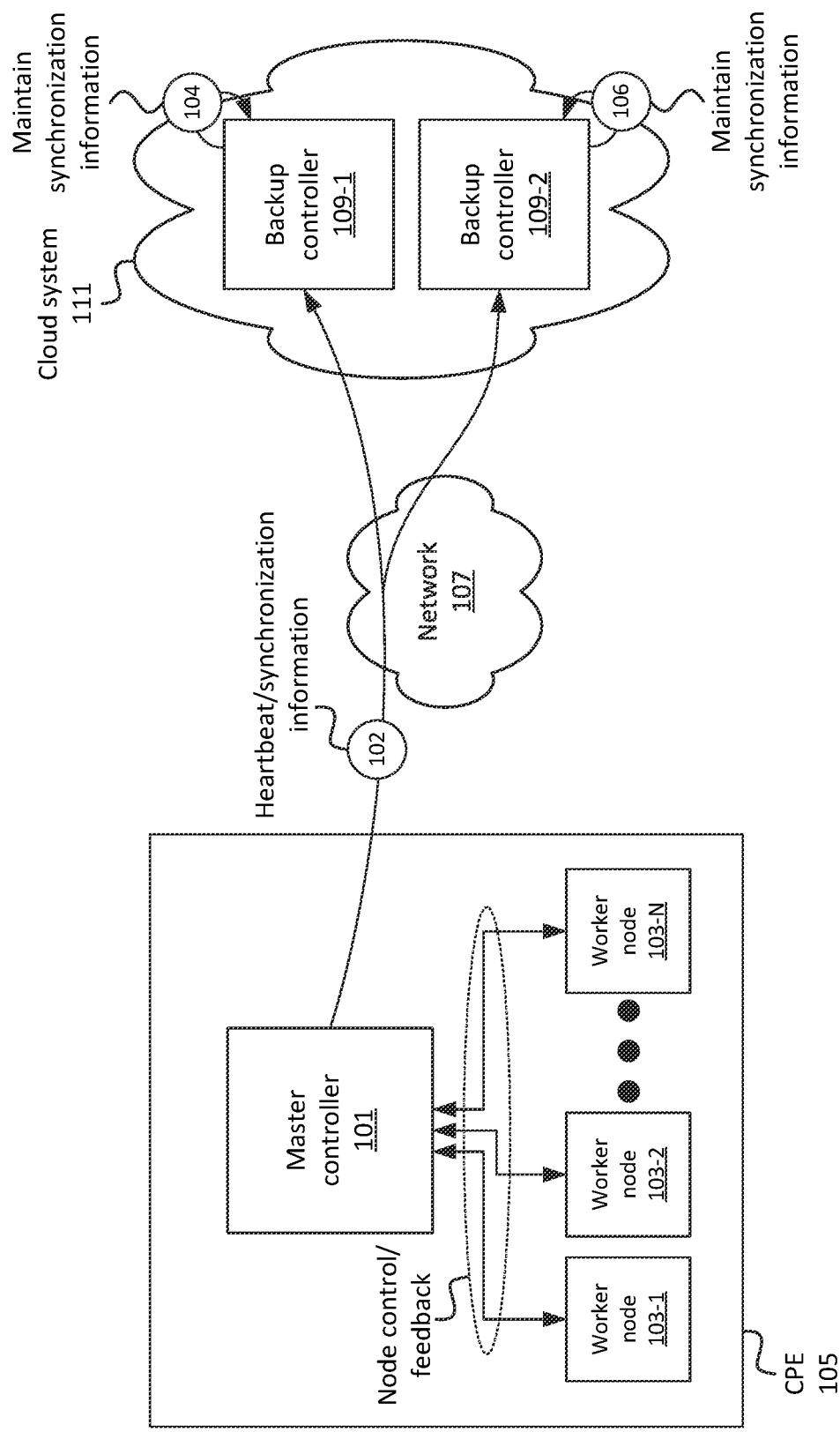
FIGS. 1A-1E illustrate an example performance-aware controller container selection procedure in accordance with some embodiments.

The following detailed description refers to the accompanying drawings. The same reference numbers in different drawings may identify the same or similar elements.

Embodiments described herein provide for performance-aware selection of containers in a containerized and/or virtualized environment. For example, some embodiments include a containerized environment wherein a first set of nodes, containers, virtual machines, etc. (referred to herein as "nodes" for the sake of brevity) may include functionality to control operations of one or more other nodes. For example, a "controller" node may include or implement a scheduler, replication controller, endpoints controller, namespace controller, and/or other type of control functionality related to controlling or affecting the operation of one or more other nodes. A "worker" node may, for example, receive commands, jobs, configuration instructions, or the like from a controller node, and execute computations or other operations based on such commands, jobs, configuration instructions, etc.

In a HA containerized environment of some embodiments, one or more controllers may be replicated, synced, etc. with one or more other containers, such that the one or more other containers serve as backups in case of failure of a container implementing a "master" controller, a "leader" controller, or the like (herein referred to as a "master" controller). For example, in the course of normal operation, one master controller may communicate with a set of containers implementing worker nodes (e.g., to instruct, configure, etc. the worker nodes), and may synchronize state information (e.g., associated with operations performed by or instructed to the worker nodes) or other information with a set of containers implementing "backup" controllers, "follower" controllers, or the like (herein referred to as "backup" controllers). In this manner, the backup controllers may provide redundancy and robustness for a containerized system that includes a set of worker nodes controlled by a master controller.

A selection procedure (sometimes referred to as an "election" process) may occur in situations where a master controller becomes unavailable. The master controller may be considered as "unavailable" when, for example, the master controller is unreachable by one or more backup controllers and/or worker nodes, performance metrics associated with the master controller fall below a threshold level, hardware associated with the master controller fails, and/or other suitable situations. For example, the election procedure may include communications between other controllers (e.g., backup controllers), to select a particular controller (e.g., a particular backup controller of a set of candidate backup controllers) to act as the master controller. In accordance with embodiments described herein, the election procedure may be performed based on performance metrics associated with candidate backup controllers, such that the performance of the overall system is maintained in situations where a master controller becomes unavailable.

For example, as shown in FIG. 1A, master controller 101 and a set of worker nodes 103 (e.g., worker nodes 103-1 through 103-N) may be implemented by a set of hardware components, such as servers, racks, datacenters, or the like. In some embodiments, the hardware that implements master controller 101 and worker nodes 103 may be referred to as customer premises equipment ("CPE") 105. In some embodiments, CPE 105 may include hardware components that communicate with each other via a local bus, a local area network ("LAN"), direct physical connections, or the like. In some embodiments, CPE 105 may include hardware components that do not communicate with each other via an external network, such as network 107. Network 107 may be "external" to CPE 105 in that network 107 may be and/or may include one or more "public" networks, such as the Internet.

While CPE 105 is shown in the figures as including master controller 101 and a set of worker nodes 103, in practice, CPE 105 may include and/or may be communicatively coupled to one or more other components, such as an orchestration component (e.g., which may facilitate the creation, instantiation, configuration, etc. of containers, such as master controller 101, worker nodes 103, etc.), a network interface, one or more hypervisors and/or virtual machines, bare metal hardware components, etc. In some embodiments, master controller 101 and worker nodes 103 may implement and/or may otherwise be associated with the open-source Kubernetes API. In some embodiments, master controller 101 and/or worker nodes 103 may implement and/or may otherwise be associated with some other containerization and/or virtualization API, system, or the like. In some embodiments, some or all of the functionality described herein with respect to one or more master controllers 101 and/or worker nodes 103 may be implemented by and/or otherwise associated with a Multi-Access/Mobile Edge Computing ("MEC") device, referred to sometimes herein simply as a "MEC," such as a private MEC that is deployed at CPE 105.

By virtue of being implemented at the same CPE 105 (e.g., at a private MEC associated with CPE 105), master controller 101 may be able to communicate with worker nodes 103 with relatively low latency, or near-zero latency (e.g., near-real time). For example, as shown, master controller 101 may provide control messages to worker nodes 103, and worker nodes 103 may provide feedback information to master controller 101. As noted above, control messages may include scheduling instructions, input parameters for computations, configuration parameters, or other suitable control messages. Further, while shown in the context of one master controller 101, in practice, worker nodes 103 may receive different types of control messages from different containers. For example, CPE 105 may include a scheduling controller, a configuration parameter controller, or the like. Concepts discussed herein with respect to master controller 101 may refer to a container that implements a particular type of controller (e.g., a scheduling controller, a configuration parameter controller, etc.) or a container that implements multiple types of controllers.

Master controller 101 may be a part of a HA system that includes a set of backup controllers 109. In this example, backup controllers 109 (e.g., backup controllers 109-1 and 109-2) may be implemented by a network-accessible resource, such as cloud system 111. Cloud system 111 may include one or more devices or systems that implement backup controllers 109. As similarly noted with respect to CPE 105, cloud system 111 may include and/or may be communicatively coupled to one or more devices or systems not explicitly shown in the figures, such as an orchestration system, one or more network interfaces, or the like.

During the course of operation of master controller 101, master controller 101 may output (at 102) heartbeat information, synchronization information, or the like to backup controllers 109 via network 107. For example, during an initialization process, a provisioning process, a configuration process, etc., master controller 101 and backup controllers 109 may have been configured as an HA system in which master controller 101 is the "master" (e.g., "leader") and backup controllers 109 are the "backups" (e.g., "followers"). In some embodiments, such a designation may have been automatically, such as based on a determination (e.g., by master controller 101, by backup controllers 109, an orchestration system, or some other device or system) that master controller 101 is implemented by the same CPE 105 as worker nodes 103. In some embodiments, such determination may have been made as part of an initial election procedure, in which master controller 101 and backup controllers 109 communicate to select a master controller from the set of controllers 101 and 109.

"Heartbeat" information sent (at 102) by master controller 101 may indicate that master controller 101 is functioning and/or is otherwise "available." In some embodiments, the heartbeat information may be sent periodically or intermittently. The receipt of expected heartbeat information (e.g., at a given interval or some other technique for determining whether "expected" heartbeat information has been received from master controller 101) may indicate that master controller 101 is functioning or is available. On the other hand, the lack of heartbeat information (e.g., a threshold quantity of missed consecutive heartbeat messages, a threshold quantity of missed heartbeat messages in a given time frame, etc.) may indicate that master controller 101 is not functioning properly or is not available. In some embodiments, the heartbeat information may include and/or may be based on "health" or performance metrics, such as temperature information of hardware associated with master controller 101 and/or CPE 105, job processing time metrics, job processing throughput metrics, or the like. In some embodiments, such metrics may be provided as raw values and/or one or more scores generated based on monitoring the performance of master controller 101. In some embodiments, master controller 101 may monitor and/or report its own performance, and/or some other device or system that is communicatively coupled to master controller 101 and/or CPE 105 may monitor and/or report health and/or performance information associated with master controller 101 and/or CPE 105.

Synchronization information sent (at 102) by master controller 101 may include state information, configuration information, job information, and/or other information associated with the operation of one or more worker nodes 103. Generally, for example, synchronization information may include information that may be used by backup controllers 109 in the event that master controller 101 becomes unavailable, and a particular backup controller 109 becomes "active" to take the place of the unavailable master controller 101. In accordance with the example shown in FIG. 1A, backup controllers 109-1 and 109-2 may maintain (at 104 and 106, respectively) such synchronization in one or more databases, data stores, or the like. In some embodiments, backup controllers 109 may utilize an "Etcd" key store or other type of storage technique in order to maintain the synchronization information. Master controller 101 may also maintain the synchronization information, in order to control the operation of worker nodes 103.

Figure 1B:
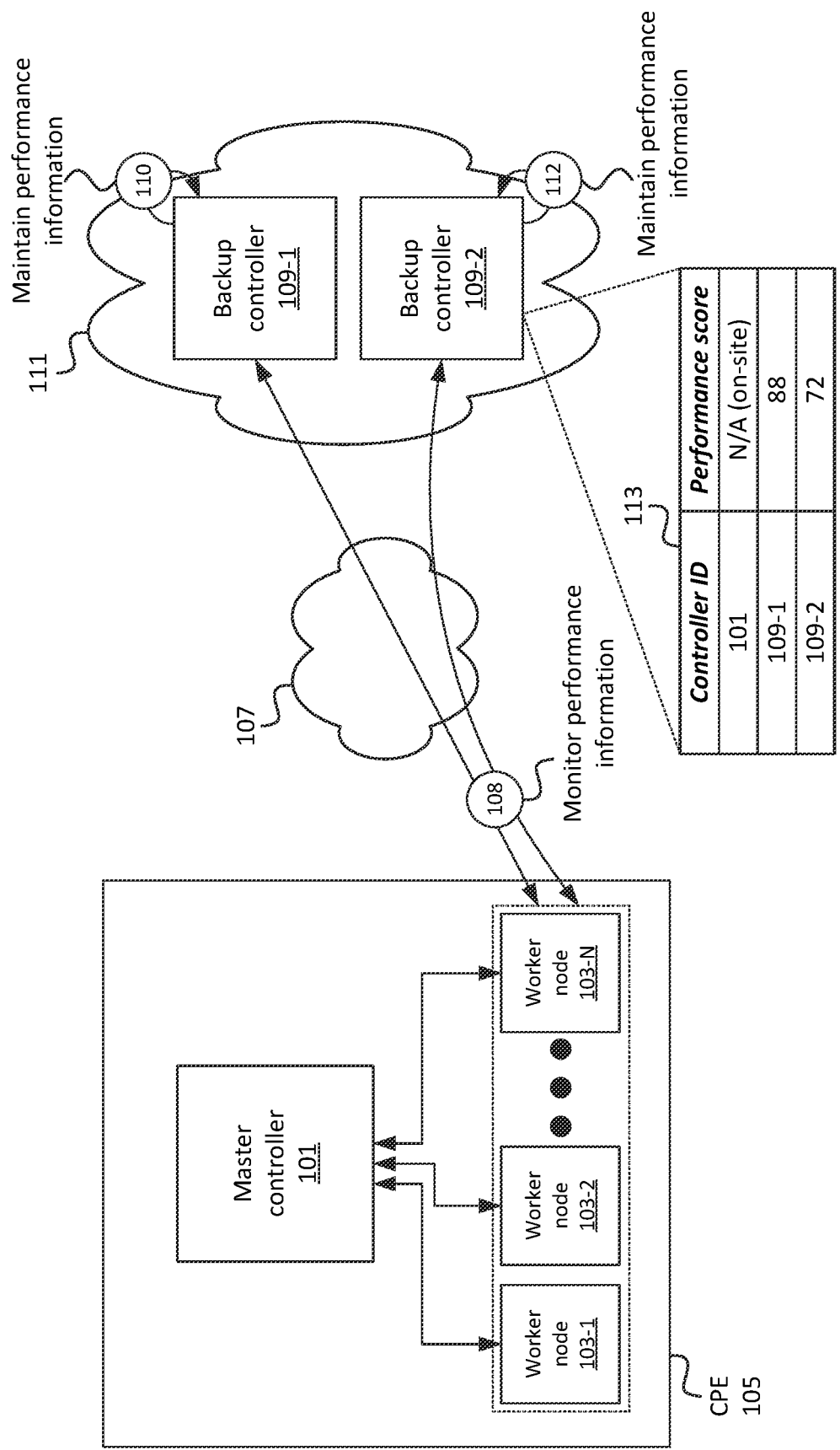

As shown in FIG. 1B, backup controllers 109 may monitor (at 108) and/or otherwise performance information associated with backup controllers 109. In some embodiments, one or more other devices or systems may measure or otherwise determine such performance information, and report the performance information to backup controllers 109, master controller 101, and/or some other device or system. The performance information may include, for example, latency metrics, throughput metrics, jitter metrics, packet error and/or loss rate metrics, or other suitable metrics. Generally, for example, the speed, reliability, performance, or other attributes of communications between respective backup controllers 109 and CPE 105 (and/or one or more worker nodes 103 associated with CPE 105) may be monitored. Such monitoring may include, for example, sending and/or receiving traffic between backup controllers 109 and one or more worker nodes 103, and measuring performance information (e.g., latency, throughput, jitter, etc.) associated with such traffic. Additionally, or alternatively, backup controllers 109 (and/or some other device or system) may measure performance of communications between respective backup controllers 109 and master controller 101, and/or may measure performance of communications between some other component of CPE 105.

In some embodiments, the monitoring (at 108) of performance information may include the distribution of the monitored performance information among backup controllers 109 and/or master controller 101. In this manner, backup controllers 109 may maintain (at 110 and 112, respectively) performance information 113 associated with backup controllers 109 and/or master controller 101. Further, in some embodiments, master controller 101 may maintain some or all of performance information 113. As shown, performance information 113 may include performance information, such as a performance score, for backup controller 109-1 and backup controller 109-2. In this example, the performance score may be generated based on one or more performance metrics, such as latency, throughput, etc. (e.g., as discussed above with respect to the monitoring at 108). In some embodiments, performance information 113 may include multiple performance scores, and/or may include one or more raw values of measured performance metrics associated with backup controllers 109-1 and 109-2. Further, performance information 113 may include an indication that master controller 101 is an "on-site" container with respect to worker nodes 103.

Figure 1C:
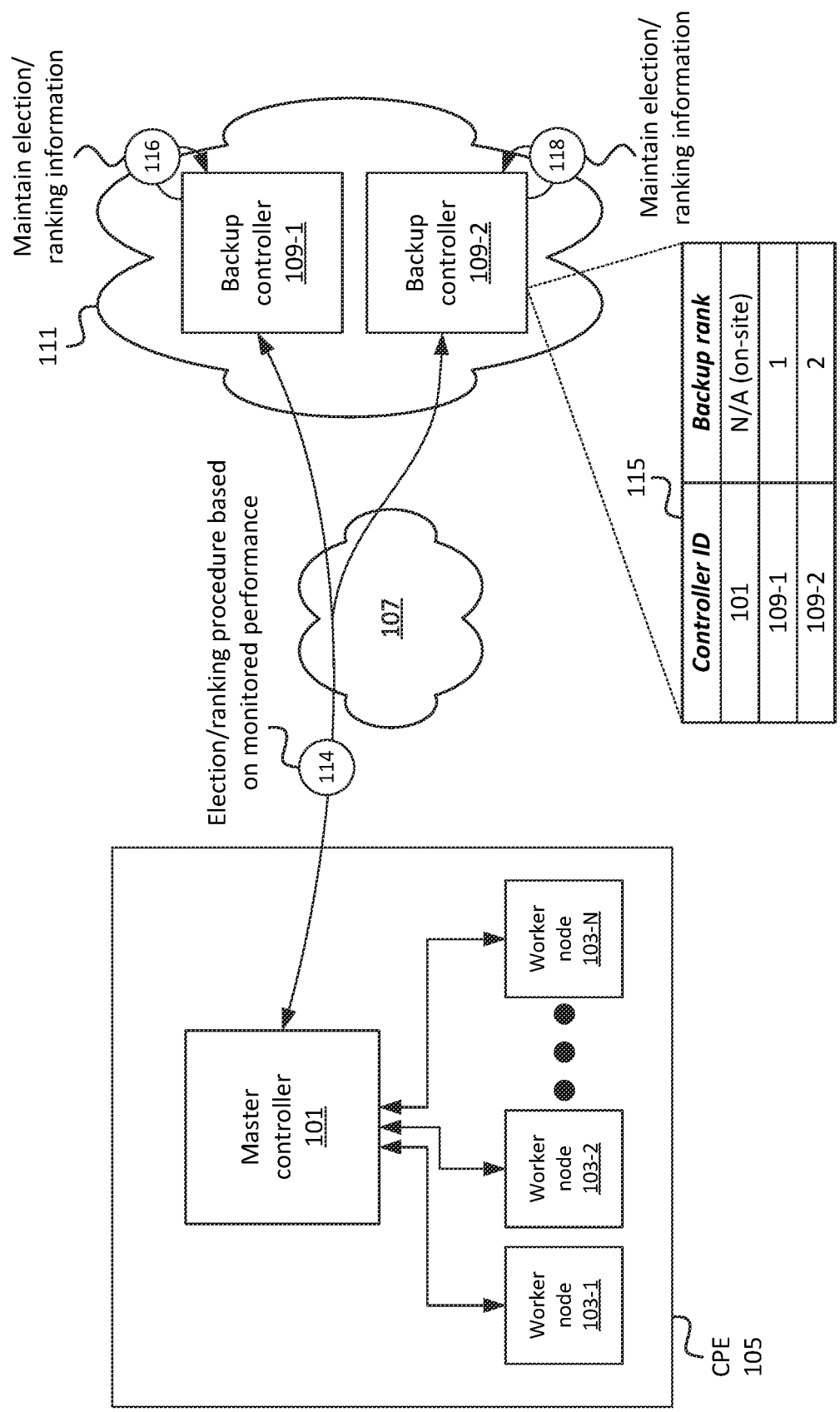

As shown in FIG. 1C, an election and/or ranking procedure may be performed (at 114) by backup controllers 109 and/or master controller 101, to select a primary backup for master controller 101 and/or to otherwise rank backup controllers 109 with respect to capability to back up master controller 101. In some embodiments, for instance, the election and/or ranking procedure may be performed based on performance information 113 (e.g., based on a comparison of performance information associated with respective backup controllers 109 with respect to CPE 105 and/or worker nodes 103). For example, backup controllers 109 and/or master controller 101 may communicate with each other to form a consensus that backup controller 109-1 is a primary backup with respect to master controller 101 (e.g., a highest ranked backup controller 109, out of a candidate set of backup controller 109 that includes at least backup controllers 109-1 and 109-2). For example, backup controller 109-1, backup controller 109-2, and/or master controller 101 may each identify that backup controller 109-1 is a highest ranked (e.g., in terms of performance score or other suitable metric) backup controller 109 out of a candidate set of backup controllers 109 (e.g., that includes backup controller 109-1 and backup controller 109-2, in this example). The election procedure may include communications in which backup controllers 109 and/or master controller 101 indicate to each other that backup controller 109-1 has been elected as a primary backup for master controller 101, and backup controllers 109 and master controller 101 may confirm that the same consensus has been reached.

Backup controllers 109-1 and 109-2 may further maintain (at 116 and 118, respectively) backup controller ranking information 115, indicating a ranking of backup controllers 109. For example, backup controller ranking information 115 may indicate that backup controller 109-1 is ranked higher than backup controller 109-2, and/or that backup controller 109-1 is a "primary" backup with respect to master controller 101. In some embodiments, backup controller ranking information 115 may further include information indicating that master controller 101 is an "on-site" (e.g., with respect to worker nodes 103) container, and/or that master controller 101 is a currently active controller (e.g., a "master" or "leader") with respect to worker nodes 103. In some embodiments, master controller 101 may also store an instance of backup controller ranking information 115.

Figure 1D:
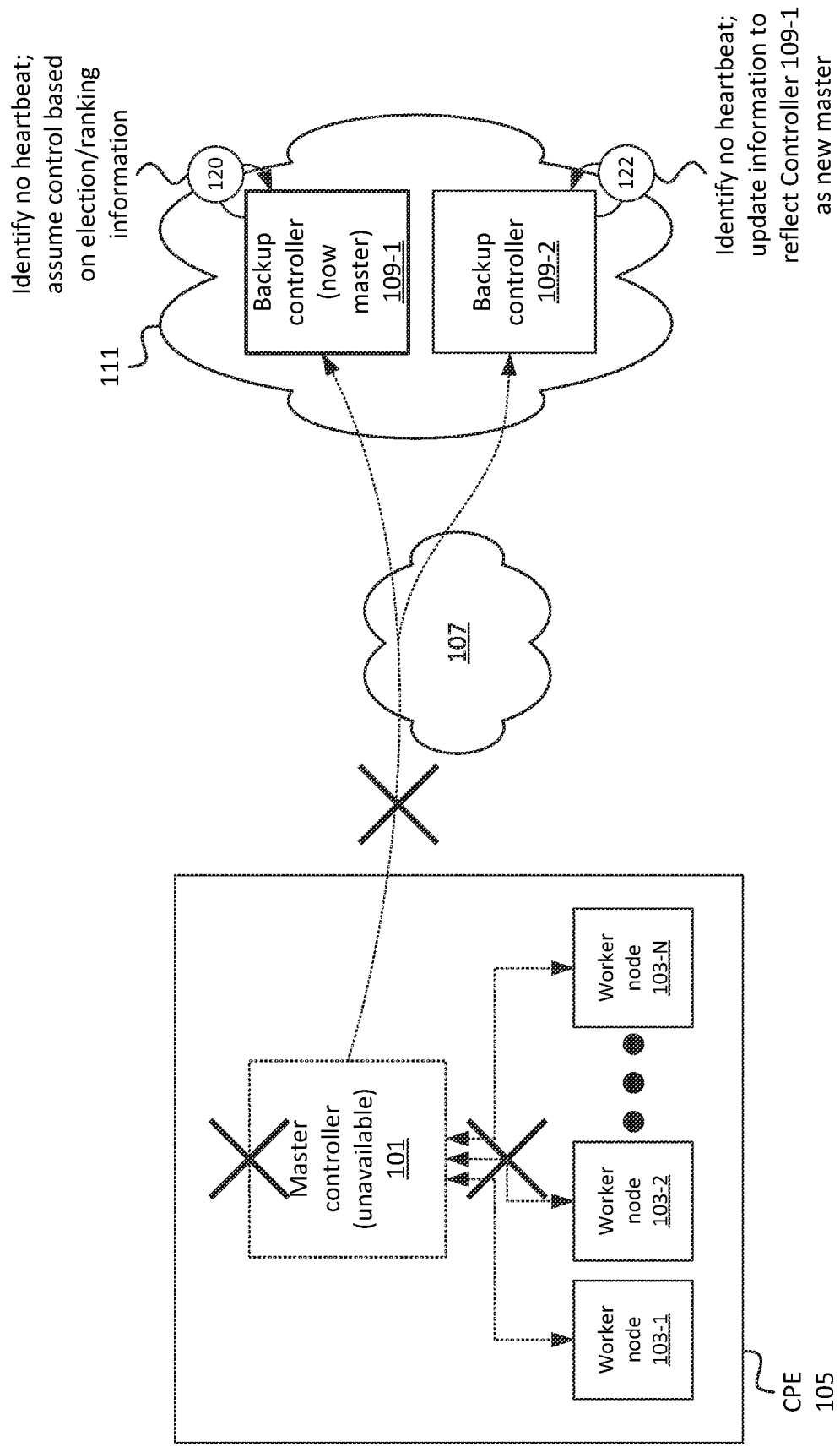

As shown in FIG. 1D, at some point, master controller 101 may become unavailable. For example, hardware associated with master controller 101 may have failed, a process associated with master controller 101 may have crashed, performance metrics associated with master controller 101 may have fallen below a threshold, or master controller 101 may have become unavailable for some other reason. As such, backup controllers 109-1 and/or 109-2 may not receive heartbeat information from master controller 101, and/or may otherwise determine that master controller 101 is unreachable or unavailable.

Based on identifying that heartbeat information has not been received from master controller 101 (and/or otherwise determining that master controller 101 is unavailable), backup controller 109-1 may assume (at 120) control of operations previously performed by master controller 101. Backup controller 109-1 may also update information maintained by backup controller 109-1 (e.g., in an Etcd key store or some other suitable storage associated with backup controller 109-1), to indicate that backup controller 109-1 is the new master controller with respect to worker nodes 103. In some embodiments, backup controller 109-2 may also identify (at 122) that master controller 101 is unavailable, and may update information maintained by backup controller 109-2 to indicate that backup controller 109-1 is the new master controller with respect to worker nodes 103. For example, in some embodiments, backup controller 109-2 may update such information based on the identification that master controller 101 is unavailable and further based on backup controller ranking information 115. That is, in such embodiments, backup controller 109-2 may update the information without receiving an indication from backup controller 109-1 that backup controller 109-1 is now the master controller. In some embodiments, backup controller 109-1 may output information to backup controller 109-2, indicating that backup controller 109-1 is the new master controller with respect to worker nodes 103. In some embodiments, backup controller 109-1 and/or backup controller 109-2 may provide an indication to worker nodes 103 that backup controller 109-1 has assumed control of worker nodes 103 (e.g., the operations previously performed by master controller 101, such as issuing commands to worker nodes 103, are now to be performed by backup controller 109-1).

Figure 1E:
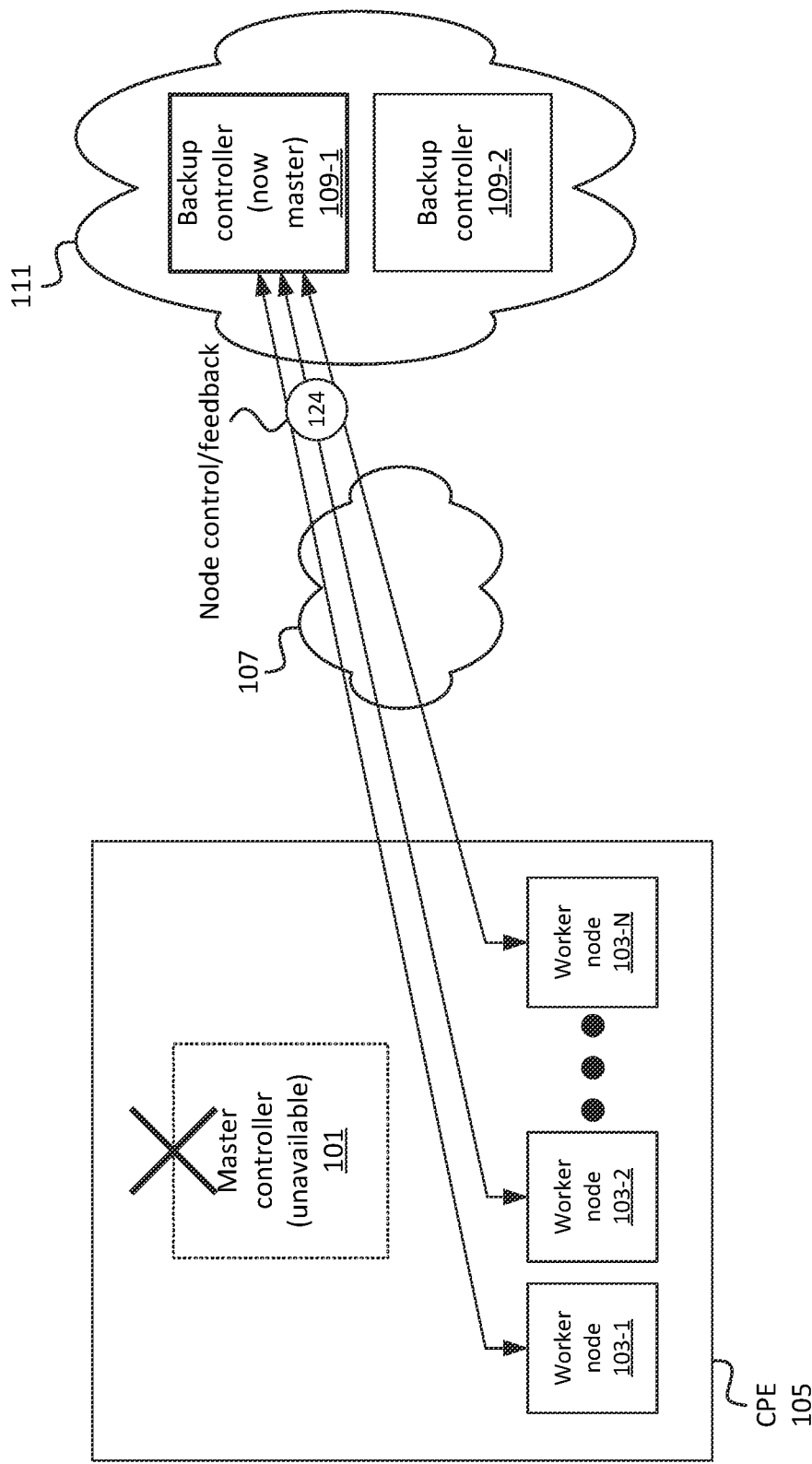

As shown in FIG. 1E, once backup controller 109-1 has assumed control (e.g., based on the failure or unavailability of master controller 101), backup controller 109-1 may communicate (at 124) with worker nodes 103. For example, as similarly described above, backup controller 109-1 may send control information to worker nodes 103, receive feedback information from worker nodes 103, and/or send or receive other suitable information via network 107. As backup controller 109-1 was selected as the backup for master controller 101 based on performance information associated with backup controller 109-1 (e.g., based on identifying that backup controller 109-1 is associated with a higher performance score with respect to worker nodes 103 than backup controller 109-2), the use of backup controller 109-1 as a backup for master controller 101 may provide for a higher measure of performance (e.g., lower latency or other performance metrics) than the use of backup controller 109-2 as a backup for master controller 101. In some embodiments, backup controller 109-1 may implement an application programming interface ("API") or other suitable communication pathway via which a user (e.g., a developer, an administrator, an orchestration system, etc.) may communicate with and/or configure worker nodes 103. Such communications may include command line commands (e.g., "kubectl" commands in an implementation that utilizes the open-source Kubernetes platform) or other suitable communications.

In systems that do not utilize a performance-aware backup controller election procedure (e.g., as described herein), an election procedure may take place that results in the election of a backup controller that does not necessarily exhibit the best performance characteristics, and/or exhibits sub-optimal performance characteristics. In some embodiments, the election procedure may utilize performance information associated with particular backup controllers 109 (e.g., performance information 113) as one factor out of multiple factors based on which backup controllers 109 are ranked. While the above example includes a ranking and/or determination of performance metrics associated with backup controllers 109 prior to the failure of master controller 101, in practice, some embodiments may determine performance metrics of backup controllers 109, rank backup controllers 109, perform an election procedure, etc. after master controller 101 has failed or otherwise become unreachable.

In some embodiments, a backup controller 109, that has assumed a "master" status (e.g., based on master controller 101 becoming unavailable) and is further not located at CPE 105, may attempt to instantiate a new controller instance at CPE 105. For example, although a given backup controller 109 (e.g., backup controller 109-1, in the examples above) may exhibit the best performance characteristics of a candidate set of cloud-based backup controllers 109 (e.g., associated with cloud system 111 that is reachable by CPE 105 via network 107), internal communications between components of CPE 105 may potentially exhibit more favorable performance characteristics (e.g., lower latency).

Figure 2A:
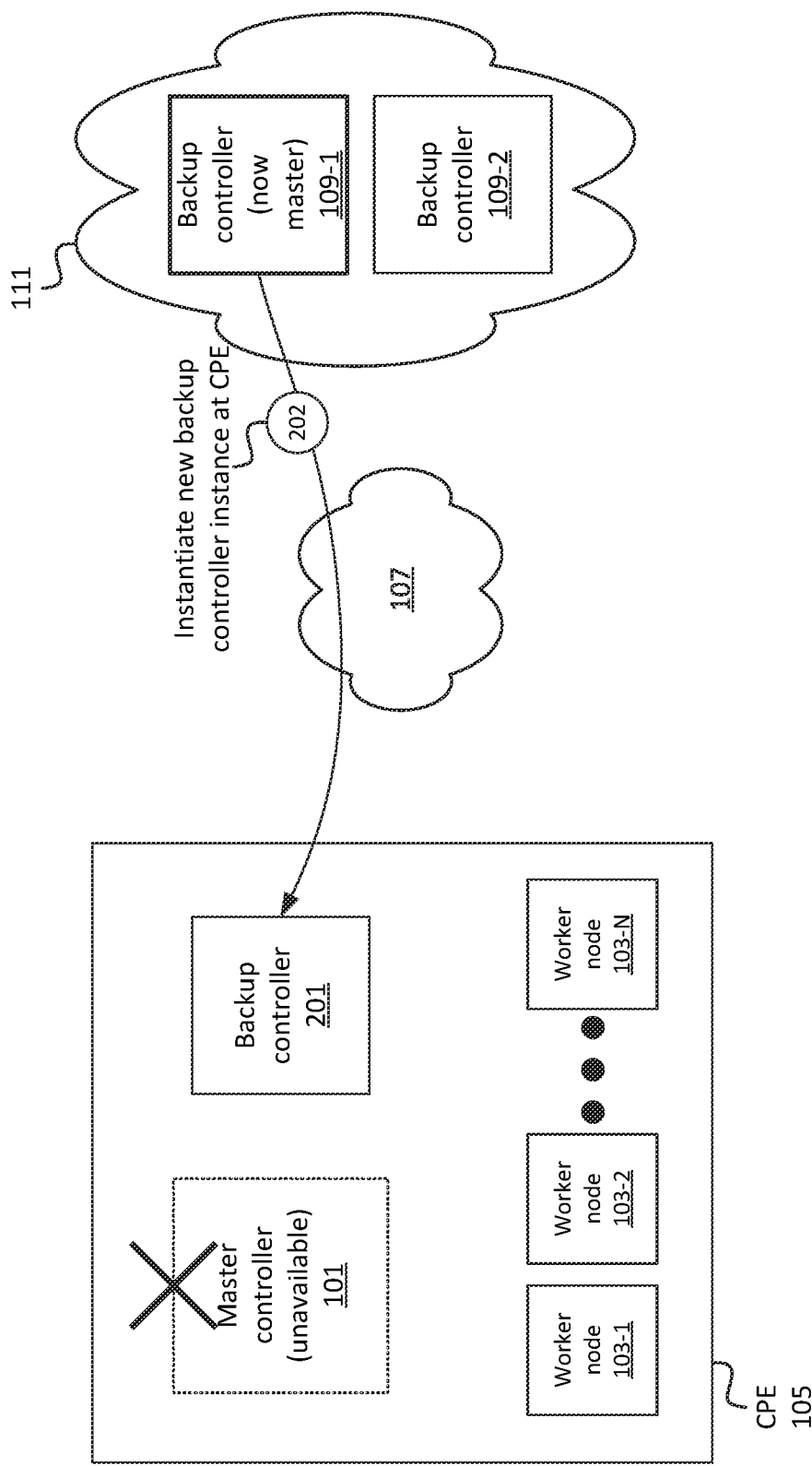
FIGS. 2A and 2B illustrate an example instantiation of a local controller container after failure of a previously active local controller container, in accordance with some embodiments.

As shown in FIG. 2A, for example, backup controller 109-1 may cause backup controller 201 to be instantiated at CPE 105. For example, backup controller 109-1 and/or CPE 105 may include and/or may be communicatively coupled to an orchestration system or other suitable mechanism by which backup controller 201 may be instantiated, provisioned, etc. at CPE 105. Backup controller 201 may be generated based on synchronization information generated or maintained by backup controller 109-1, which may include a state of operation of one or more processes, jobs, etc. associated with worker nodes 103. As such, part of the instantiation (at 202) of backup controller 201 may include using the synchronization information to allow backup controller 201 to seamlessly continue the control operations performed by backup controller 109-1.

Figure 2B:
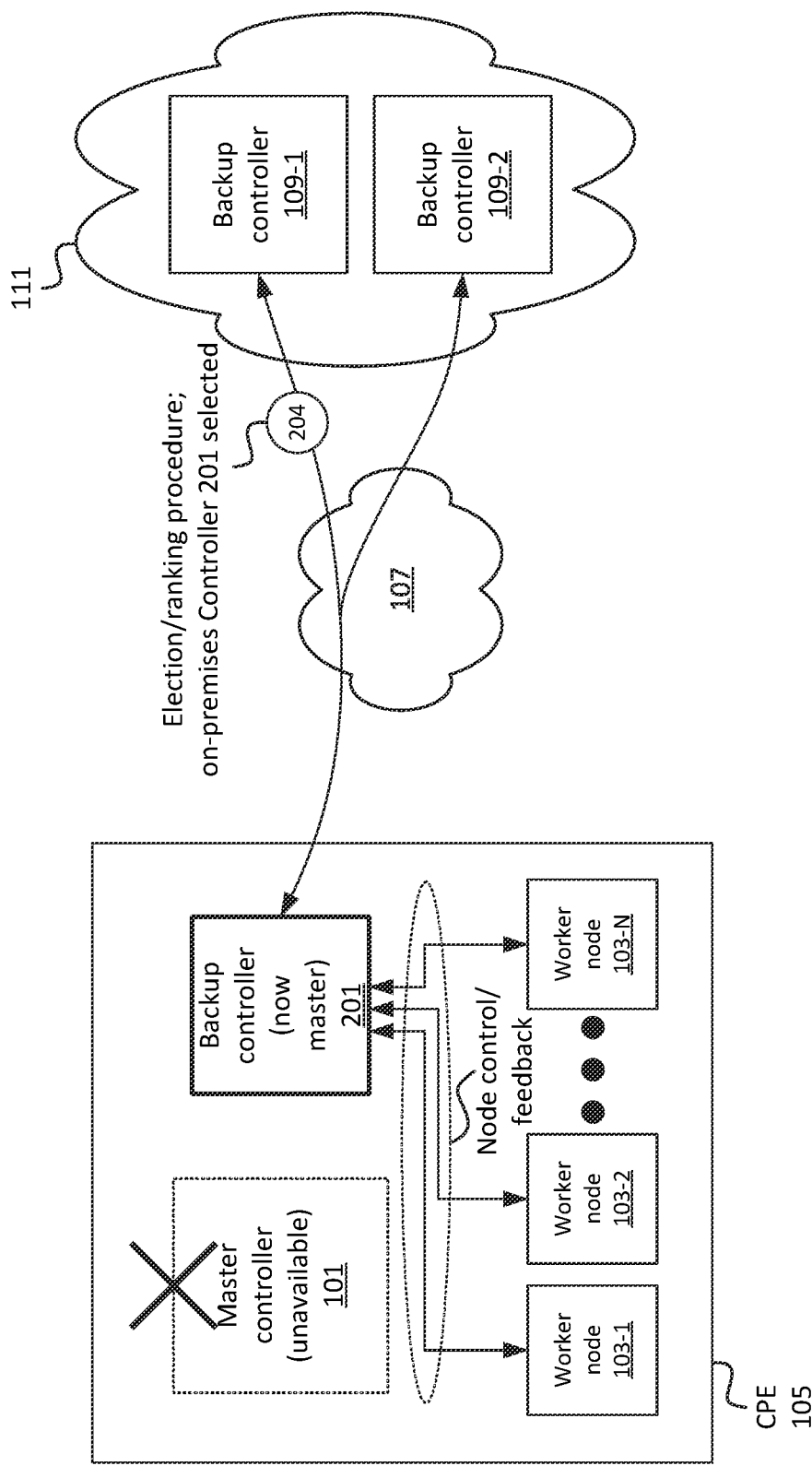

As shown in FIG. 2B, once backup controller 201 has been instantiated at CPE 105, backup controllers 109 and/or backup controller 201 may perform (at 204) an election and/or ranking process, in a manner similarly discussed above. Based on this process, backup controllers 109 and/or backup controller 201 may identify that backup controller 201 is an "on-premises" container with respect to worker nodes 103, and that backup controller 201 should become the master (e.g., "leader") based on being "on-premises" with respect to worker nodes 103. For example, backup controller 201 may be "on-premises" with respect to worker nodes 103 based on being implemented by the same hardware resources (e.g., associated with CPE 105) and/or based on backup controller 201 being able to communicate with worker nodes 103 without traversing network 107 (e.g., the Internet). Once backup controller 201 is selected as the new master controller with respect to worker nodes 103, backup controller 201 may assume the master role and communicate control and/or feedback information with worker nodes 103, in order to continue operation of worker nodes 103 with backup controller 201 as the master. In some embodiments, backup controller 201 (e.g., the newly elected master) may implement an API, a Virtual Private Network ("VPN"), or other suitable communication pathway via which a user (e.g., a developer, an administrator, an orchestration system, etc.) may communicate with and/or configure worker nodes 103.

Figure 3:
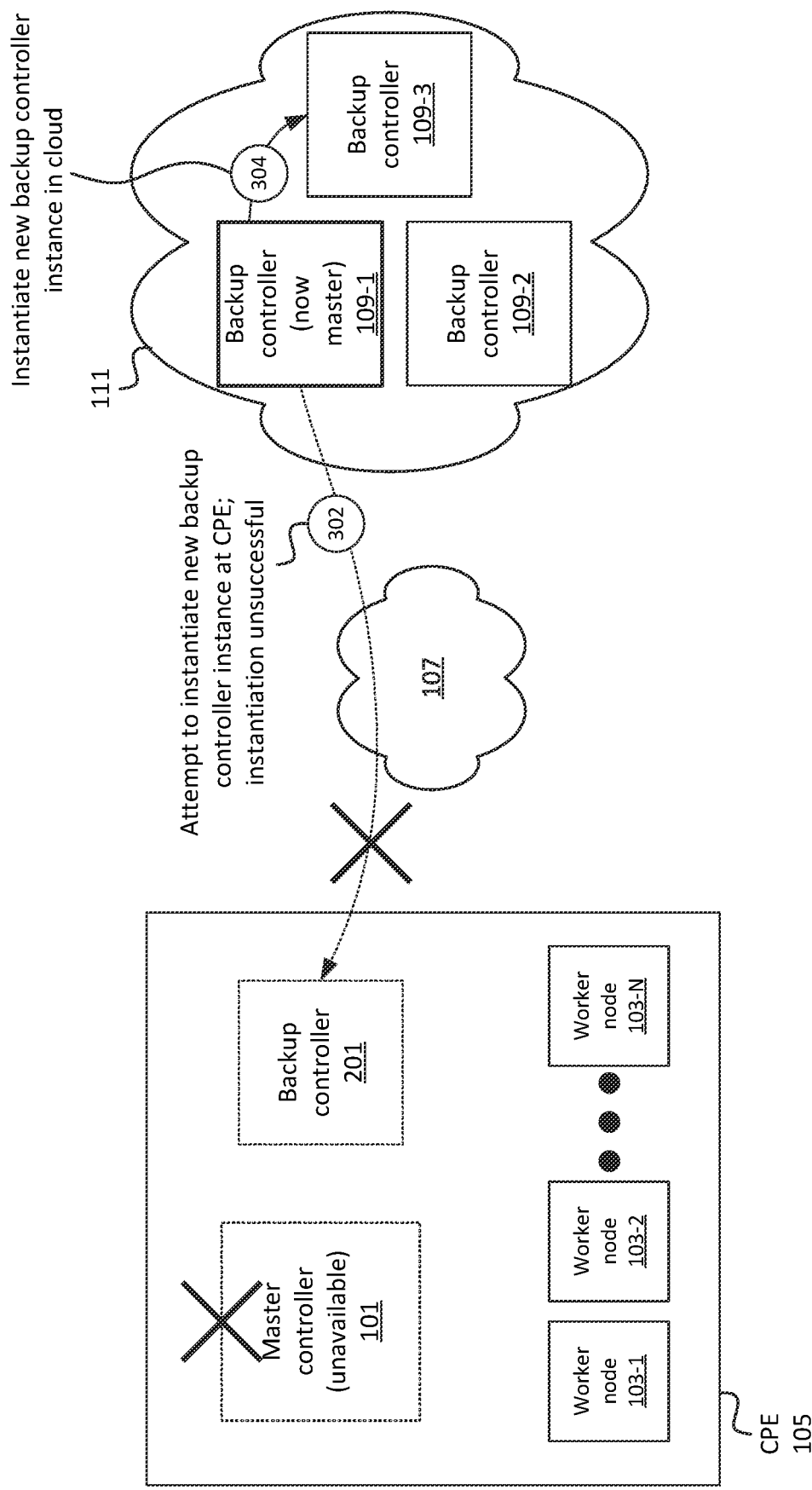
FIG. 3 illustrates an example instantiation of a backup cloud controller container after attempting to instantiate a local controller container, in accordance with some embodiments.

In some situations, as shown in FIG. 3, backup controller 201 may not be able to be instantiated (at 302) at CPE 105. For example, CPE 105 may not have resource capacity to instantiate backup controller 201, and/or some other circumstance may prevent the instantiation of backup controller 201 at CPE 105. Based on the failed attempt (at 302) to instantiate backup controller 201 at CPE 105, backup controller 109-1 may cause (at 304) an instance of backup controller 109-3 to be instantiated at cloud system 111. For example, in accordance with some master controller election protocols, a "quorum" of three or more controllers may be needed. In order to meet this threshold, backup controller 109-1 may instantiate a third instance of backup controller 109, in situations where the remaining controllers (e.g., after the failure of master controller 101) include two or fewer backup controllers 109. In some embodiments, a different threshold quantity of controllers may be required to establish quorum for master controller election. In such embodiments, multiple instances of backup controller 109 may be instantiated, in order to meet the threshold minimum quantity of controllers for master controller election quorum purposes.

Figure 4:
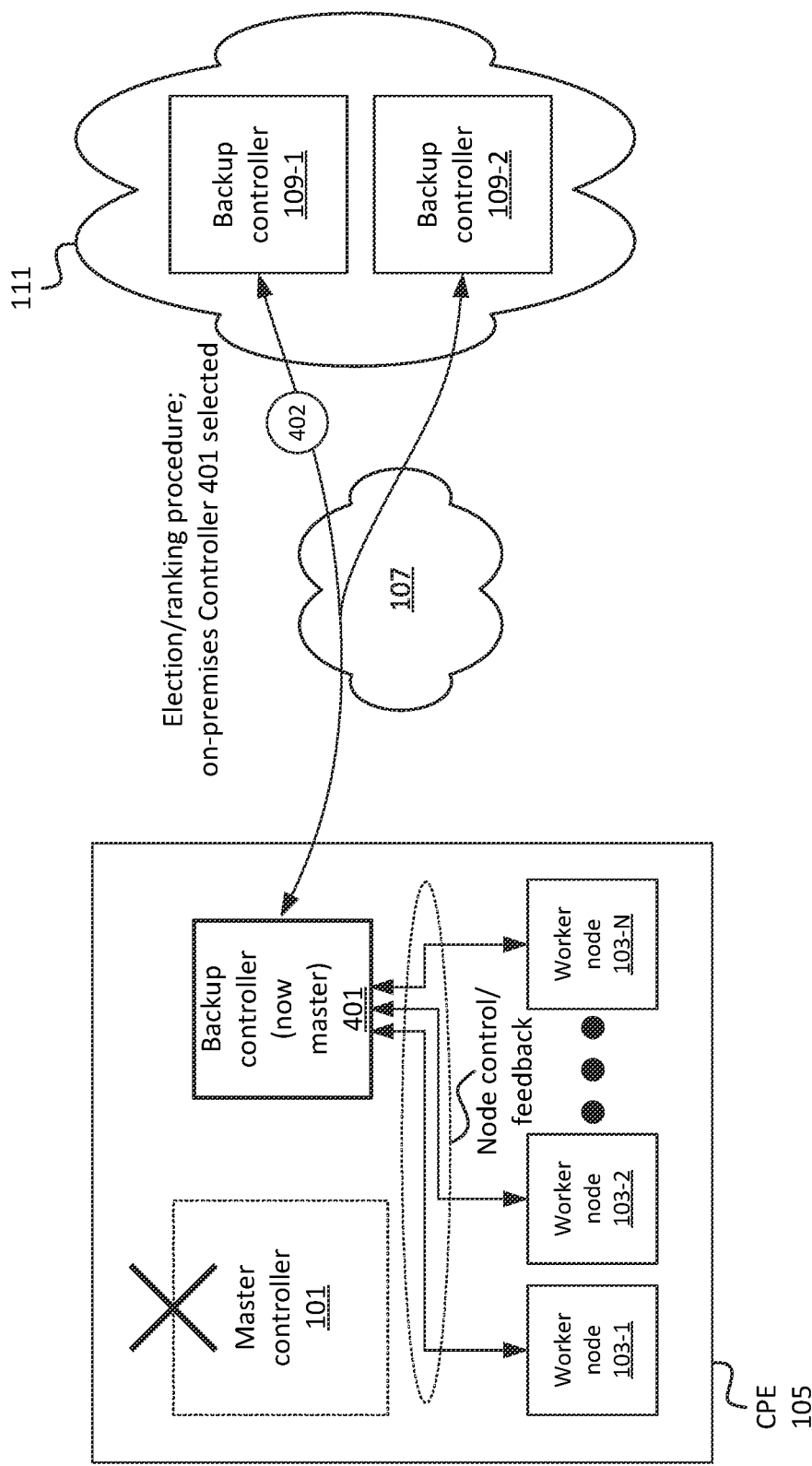
FIG. 4 illustrates an example arrangement in accordance with some embodiments, in which multiple local controller containers may be used.

In some embodiments, CPE 105 may include multiple controller instances. For example, as shown in FIG. 4, CPE 105 may include master controller 101 and local backup controller 401. In situations where master controller 101 becomes unavailable, local backup controller 401 may assume control based on an election procedure (at 402) between local backup controller 401 and backup controllers 109 (e.g., backup controllers 109-1 and 109-2). For example, master controllers 101 and local backup controller 401 may be associated with (e.g., in an Etcd key store or other shared database or information that is associated with master controller 101, local backup controller 401, and/or backup controllers 109) a flag or other indicator indicating that local backup controller 401 is "on-premises" with respect to master controller 101 and/or worker nodes 103. Based on such indicator, the election procedure (at 402) may include selecting local backup controller 401 (e.g., in lieu of backup controllers 109) to resume operations of master controller 101 (e.g., control of worker nodes 103).

Figure 5:
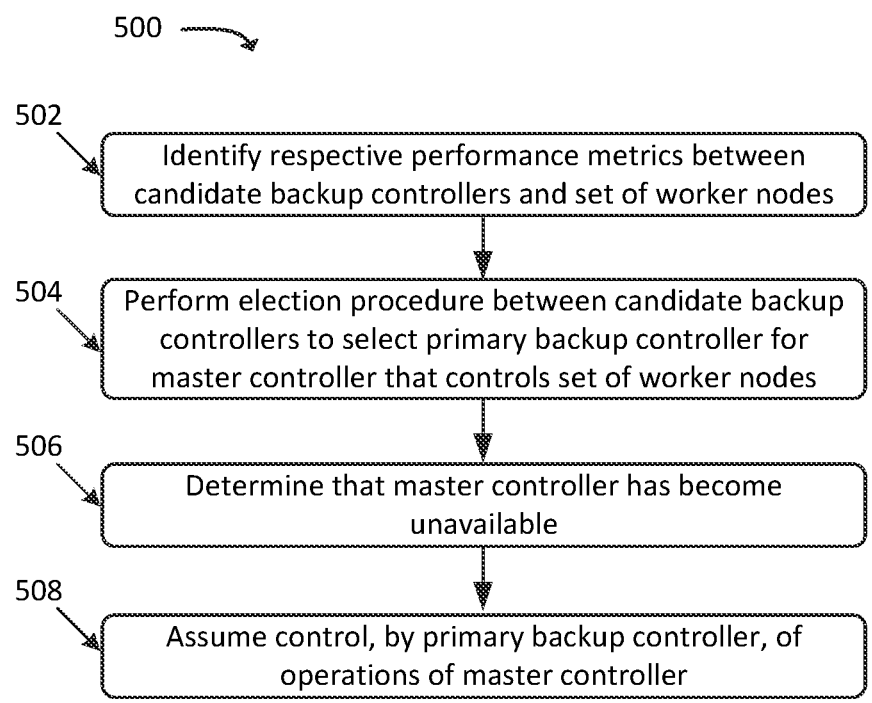
FIG. 5 illustrates an example process for electing a primary backup controller for a given master controller, in accordance with some embodiments.

FIG. 5 illustrates an example process 500 for electing a primary backup controller 109 for a given master controller 101 (e.g., a master controller 101 that is implemented by the same CPE 105 and/or set of hardware as a set of worker nodes 103). In some embodiments, some or all of process 500 may be performed by backup controller 109 (e.g., a cloud-based backup controller 109 that is communicatively coupled to worker nodes 103 via network 107). In some embodiments, one or more other devices may perform some or all of process 500 (e.g., in concert with, and/or in lieu of, backup controller 109).

As shown, process 500 may include identifying (at 502) respective performance metrics between a candidate set of backup controllers 109 and a set of worker nodes 103. For example, backup controllers 109 may be part of a HA system that includes a "leader" or master controller 101 and that further includes a set of "followers" or backup controllers 109. As noted above, master controller 101 may issue commands, configuration information, scheduling information, or the like to worker nodes 103. Master controller 101 may, for example, be an "on-premises" container of a containerized system, and backup controllers 109 may be cloud-based containers of the containerized system (e.g., where backup controllers 109 communicate with master controller 101 and/or worker nodes 103 via network 107, and wherein master controller 101 and worker nodes 103 may communicate without using network 107). The performance metrics for a given backup controller 109 may include, for example, latency or other characteristics of traffic sent between the given backup controller 109 and one or more worker nodes 103 of CPE 105 and/or some other device or system associated with CPE 105. For example, a first backup controller 109 may exhibit relatively low latency for communications between the first backup controller 109 and CPE 105, while a second backup controller 109 may exhibit relatively high latency for communications between the second backup controller 109 and CPE 105. Backup controllers 109 may provide performance metrics to each other, and/or may provide performance metrics to some other device or system that distributes such information to backup controllers 109. In this manner, backup controllers 109 may maintain performance metric information for one or more other backup controllers 109.

Process 500 may further include performing (at 504) an election procedure with the other backup controllers 109 and/or with master controller 101. For example, backup controllers 109 and/or master controller 101 may perform the election procedure periodically and/or intermittently (e.g., on an ongoing and/or iterative basis) in order to maintain an up-to-date primary backup for master controller 101. Additionally, or alternatively, backup controllers 109 may perform the election procedure at some other time and/or on an event-driven basis, such as upon making a determination (e.g., as discussed below) that master controller 101 has become non-operational and/or unreachable. As discussed above, the election procedure may include selecting a particular backup controller 109, of the set of backup controllers 109, to act as a backup (or primary backup) for master controller 101. As additionally discussed above, the election may be performed based on the performance metrics (identified at 502), and may include identifying a particular backup controller 109, of the set of backup controllers 109, that exhibits lower latency than the other backup controllers 109 and/or otherwise is associated with a higher performance score as compared to the other backup controllers 109.

Process 500 may additionally include determining (at 506) that master controller 101 has become unavailable. For example, one or more backup controllers 109 may identify that one or more heartbeat messages from master controller 101 have not been received for at least a threshold amount of time, and/or may otherwise determine that master controller 101 has become unreachable.

Process 500 may also include assuming (at 508) control, by the elected backup controller 109 of the operations of master controller 101. For example, backup controller 109 that has been elected (at 504) as the primary backup for master controller 101 may communicate with worker nodes 103 that were previously controlled by master controller 101. In some embodiments, the selected backup controller 109 may output an indication to the other backup controllers 109 and/or to worker nodes 103 that the selected backup controller 109 has assumed control of the operations previously performed by master controller 101. As such backup controller 109 was selected (at 504) based on relative performance characteristics of the set of backup controllers 109, the performance of the system may be preserved as compared to a selection process that does not take performance characteristics (e.g., between respective backup controllers 109 and worker nodes 103) into account.

Figure 6:
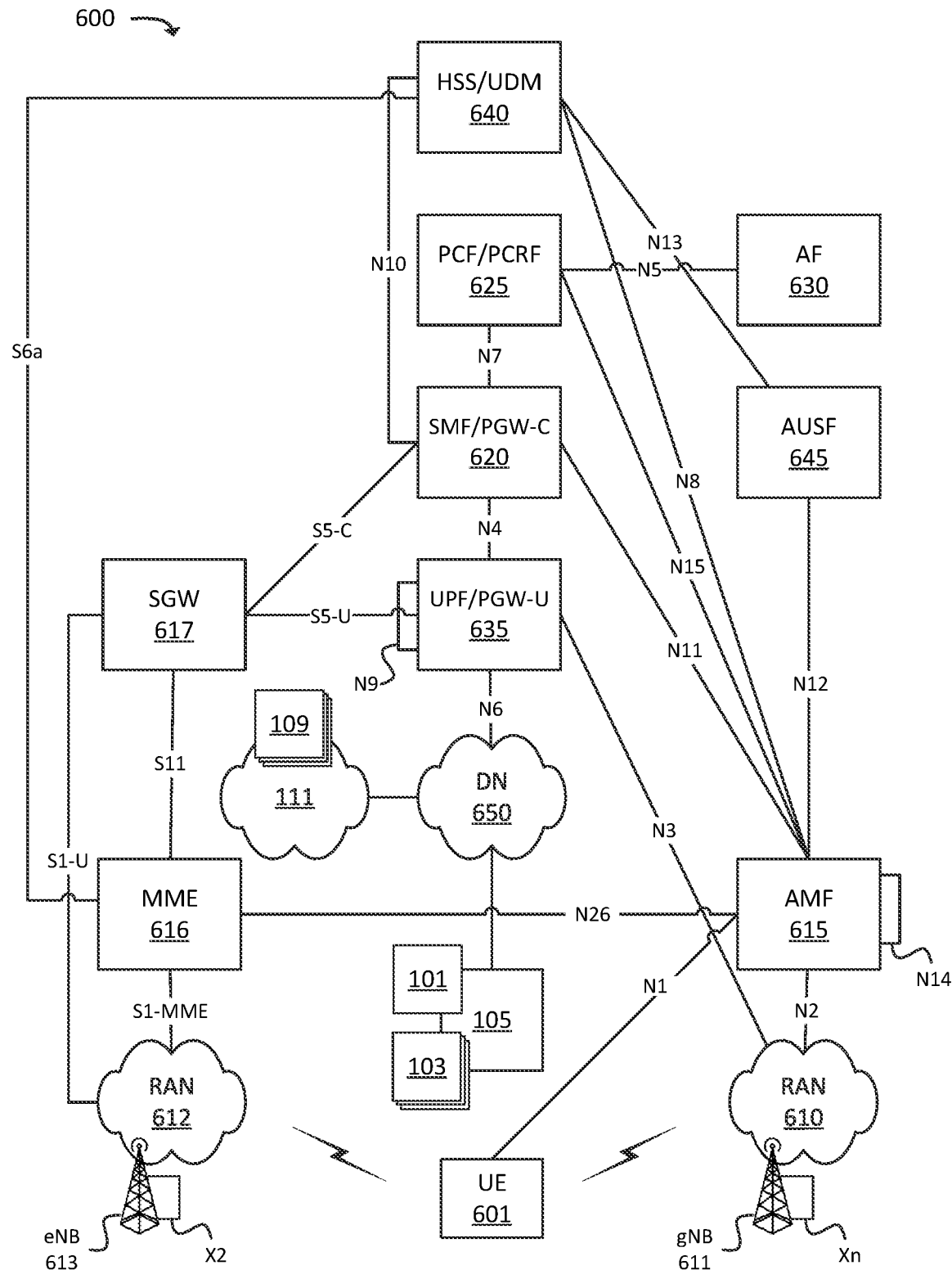
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as master controller 101, worker node 103, CPE 105, backup controller 109, and/or cloud system 111, which may perform one or more of the operations described above.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 601 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 615, and/or one or more other devices or networks) and may communicate the traffic to UE 601 via the air interface.

RAN 612 may be, or may include, a LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 615 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate. In some embodiments, DN 650 may include and/or may be communicatively coupled to network 107

Figure 7:
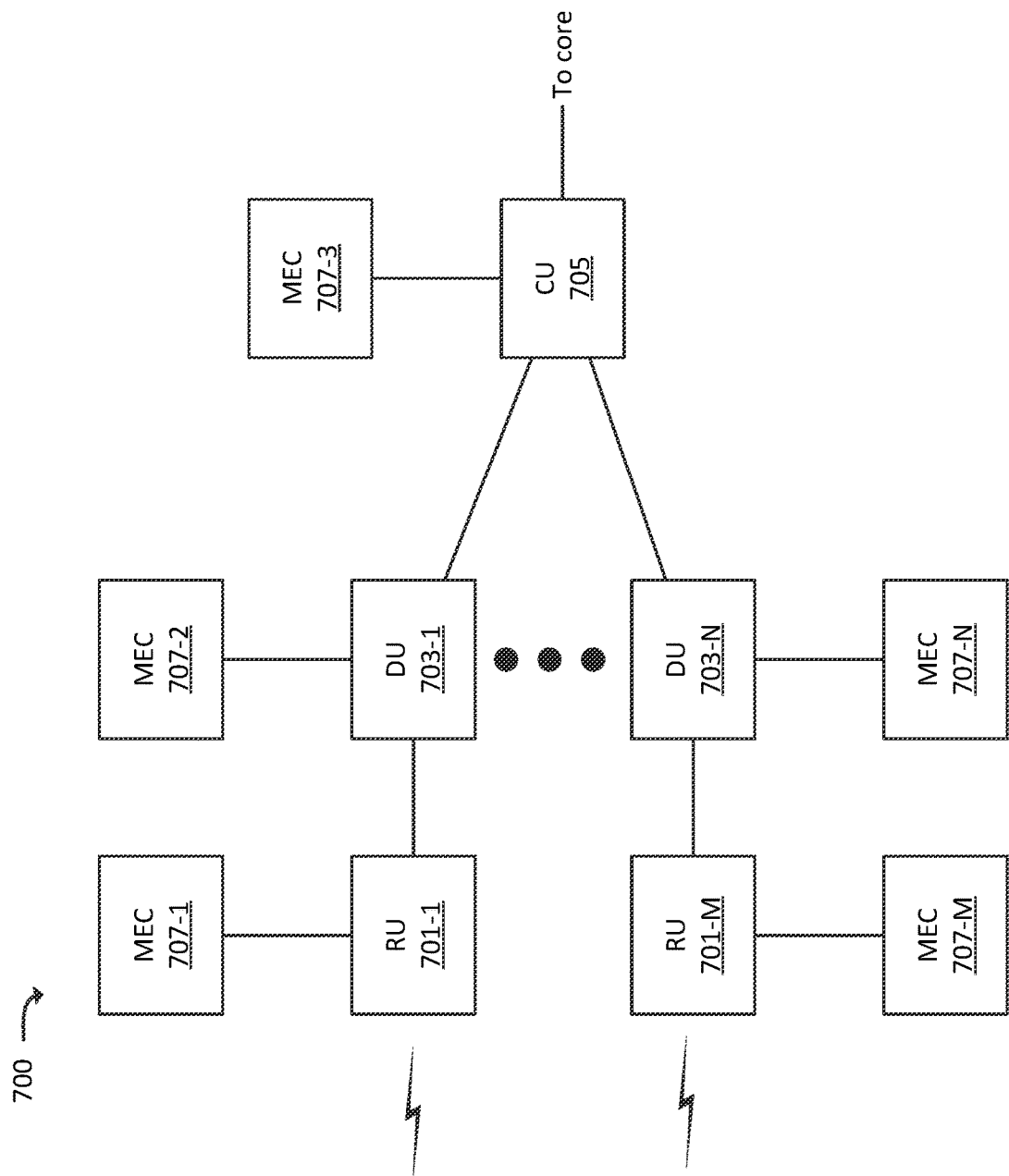
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more MECs 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701.

For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network. In some embodiments, MEC 707 may include, and/or may implement, some or all of the functionality described above with respect to master controller 101, worker node 103, and/or backup controller 109.

Figure 8:
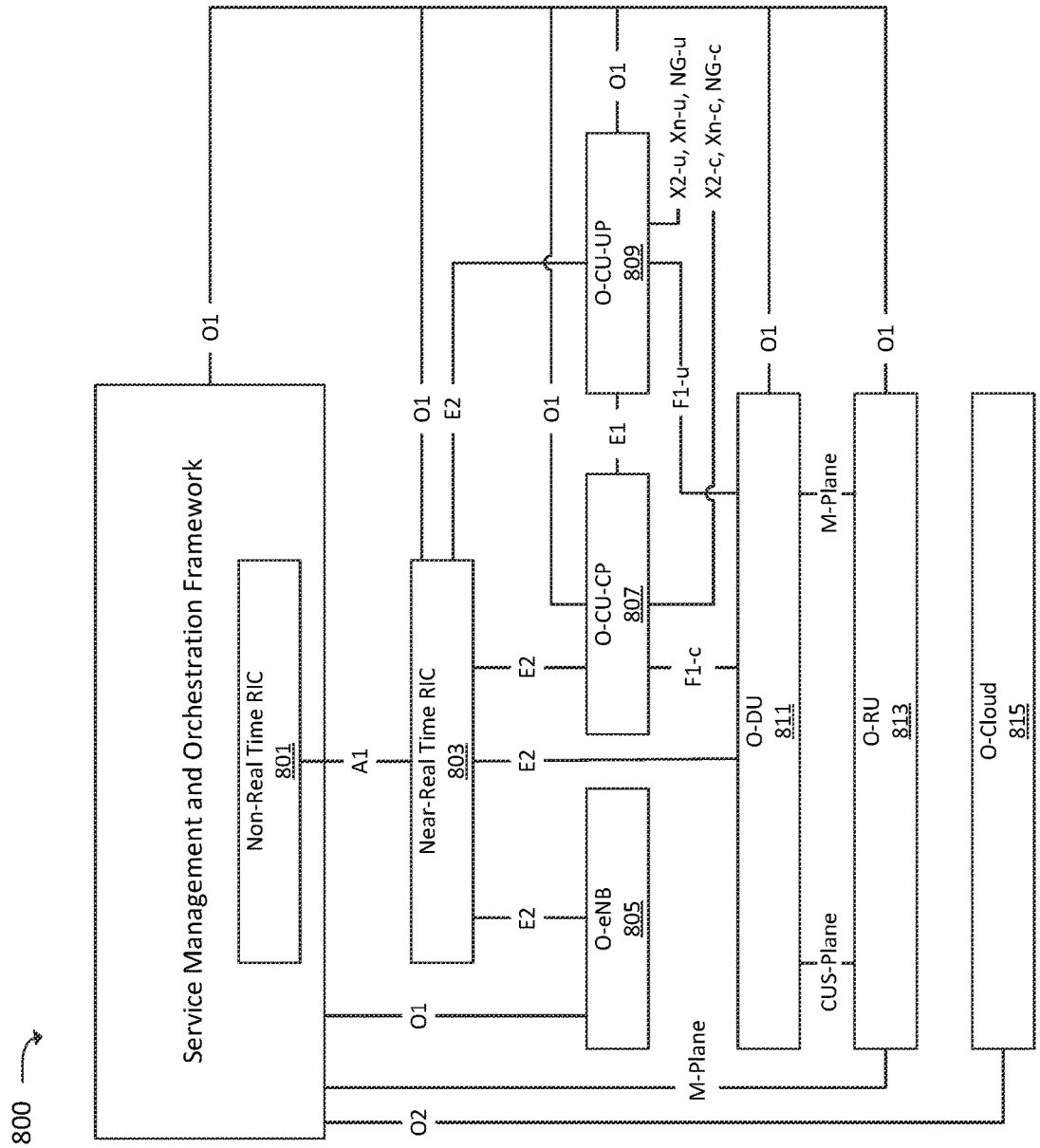
FIG. 8 illustrates an example arrangement of an Open RAN ("O-RAN") environment in which one or more embodiments, described herein, may be implemented.

FIG. 8 illustrates an example O-RAN environment 800, which may correspond to RAN 610, RAN 612, and/or DU network 700. For example, RAN 610, RAN 612, and/or DU network 700 may include one or more instances of O-RAN environment 800, and/or one or more instances of O-RAN environment 800 may implement RAN 610, RAN 612, DU network 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 707. In some embodiments, some of the components of O-RAN environment 800 may implement and/or may be communicatively coupled to one or more master controllers 101, worker nodes 103, and/or backup controllers 109.

Non-Real Time RIC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time RIC 803 for implementation.

O-eNB 805 may perform functions similar to those described above with respect to eNB 613. For example, O-eNB 805 may facilitate wireless communications between UE 601 and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 707, which may provide services, and may be communicatively coupled, to O-CU-CP 807, O-CU-UP 809, O-DU 811, and/or O-RU 813 (e.g., via an O1 and/or O2 interface).

Figure 9:
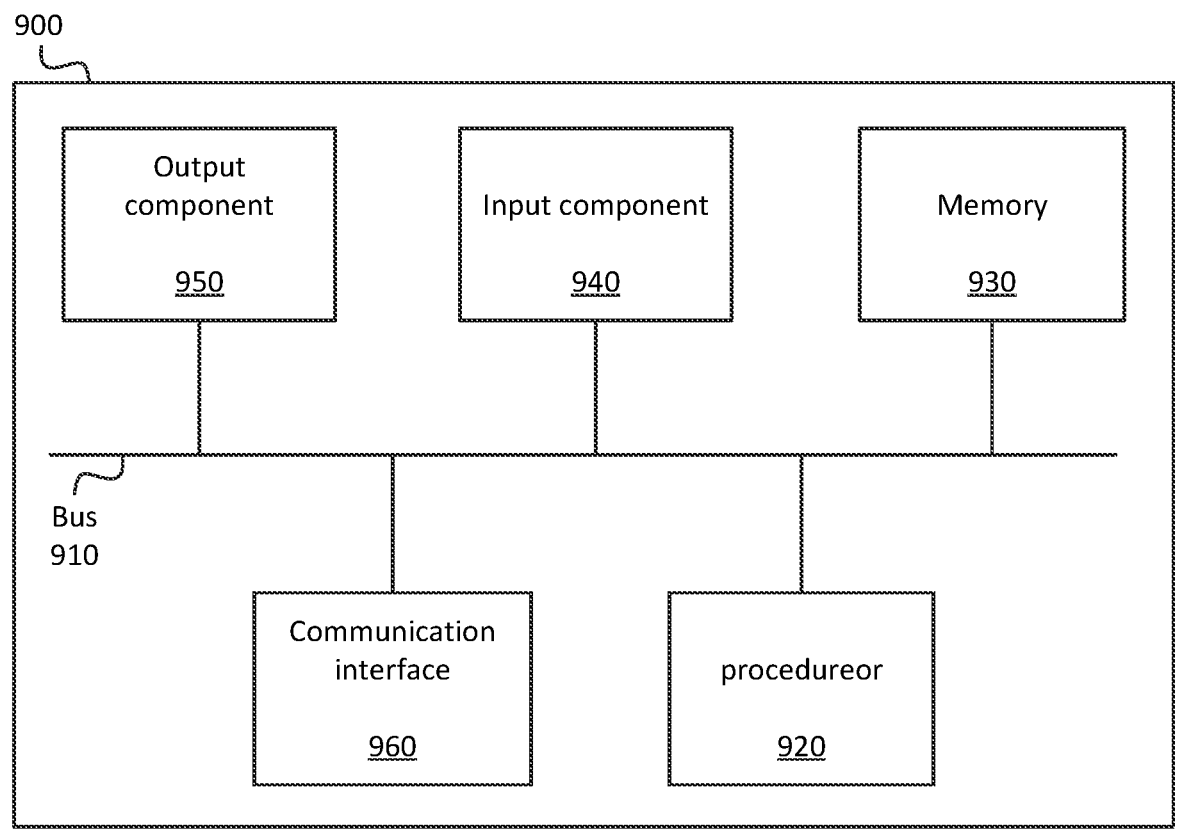
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1E, 2A, 2B, and 3-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while some examples are provided in the context of two cloud-based backup controllers 109 (e.g., backup controller 109-1 and backup controller 109-2), similar concepts may apply to three or more backup controllers 109 (e.g., three or more cloud-based backup controllers 109). For example, a third backup controller 109-3, a fourth backup controller 109-4, etc. may perform similar operations described above with respect to backup controller 109-2. Such operations may include maintaining shared information regarding master controller 101 and/or backup controllers 109 (e.g., in an Etcd key store or other suitable data store), participating in an election procedure in which backup controller 109-1 is elected to take over operations of master controller 101 in the event of the failure or unavailability of master controller 101, and/or other operations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
   one or more processors configured to:
   identify first performance metrics associated with communications between the first device and a set of hardware that implements a plurality of containers, wherein the plurality of containers includes a controller and one or more worker nodes that operate based on commands from the controller;
   identify second performance metrics associated with communications between a second device and the set of hardware that implements the plurality of containers;
   participate in a first election procedure with at least the second device, wherein the first election procedure includes selecting the first device based on a comparison of the first and second performance metrics;
   determine that the controller has become unavailable;
   based on determining that the controller has become unavailable and further based on the selection of the first device in the first election procedure, assume control of operations of the controller, including issuing commands to the one or more worker nodes;
   determine that a quantity of backup containers associated with the controller is fewer than a quorum threshold quantity after the controller becomes unavailable;
   based on determining that the quantity of backup containers is fewer than the quorum threshold quantity, instantiate a new backup container at the set of hardware that implements the plurality of containers; and
   participate in a second election procedure in which the new backup container is selected to assume control of operations of the first device, including issuing commands to the one or more worker nodes.

2. The device of claim 1, wherein the first election procedure is performed prior to the determination that the controller has become unavailable.

3. The device of claim 1, wherein the first election procedure is performed after the determination that the controller has become unavailable.

4. The device of claim 1, wherein the controller includes a scheduler that issues scheduling commands to the one or more worker nodes.

5. The device of claim 1, wherein the first and second devices communicate with the one or more worker nodes via a particular network and the controller communicates with the one or more worker nodes without using the particular network.

6. The device of claim 1, wherein the first performance metrics include a first measure of latency between the first device and the one or more worker nodes and the second performance metrics include a second measure of latency between the second device and the one or more worker nodes.

7. The first device of claim 1, wherein the set of hardware that implements the plurality of containers is a first set of hardware, wherein at least one of the first device or the second device is implemented by a second set of hardware that is connected to the first set of hardware via a network.

8. A non-transitory computer-readable medium, storing a plurality of processor-executable instructions to:
   identify first performance metrics associated with communications between a first device and a set of hardware that implements a plurality of containers, wherein the plurality of containers includes a controller and one or more worker nodes that operate based on commands from the controller;
   identify second performance metrics associated with communications between a second device and the set of hardware that implements the plurality of containers;
   participate in a first election procedure with at least the second device, wherein the first election procedure includes selecting the first device based on a comparison of the first and second performance metrics;
   determine that the controller has become unavailable;
   based on determining that the controller has become unavailable and further based on the selection of the first device in the first election procedure, assume control of operations of the controller, including issuing commands to the one or more worker nodes;
   determine that a quantity of backup containers associated with the controller is fewer than a quorum threshold quantity after the controller becomes unavailable;
   based on determining that the quantity of backup containers is fewer than the quorum threshold quantity, instantiate a new backup container at the set of hardware that implements the plurality of containers; and participate in a second election procedure in which the new backup container is selected to assume control of operations of the first device, including issuing commands to the one or more worker nodes.

9. The non-transitory computer-readable medium of claim 8, wherein the first election procedure is performed prior to the determination that the controller has become unavailable.

10. The non-transitory computer-readable medium of claim 8, wherein the first election procedure is performed after the determination that the controller has become unavailable.

11. The non-transitory computer-readable medium of claim 8, wherein the controller includes a scheduler that issues scheduling commands to the one or more worker nodes.

12. The non-transitory computer-readable medium of claim 8, wherein the first and second devices communicate with the one or more worker nodes via a particular network and the controller communicates with the one or more worker nodes without using the particular network.

13. The non-transitory computer-readable medium of claim 8, wherein the first performance metrics include a first measure of latency between the first device and the one or more worker nodes and the second performance metrics include a second measure of latency between the second device and the one or more worker nodes.

14. The non-transitory computer-readable medium of claim 8, wherein the set of hardware that implements a plurality of containers is a first set of hardware, wherein at least one of the first device or the second device is implemented by a second set of hardware that is connected to the first set of hardware via a network.

15. A method, comprising:
identifying, by a first device, first performance metrics associated with communications between the first device and a set of hardware that implements a plurality of containers, wherein the plurality of containers includes a controller and one or more workers that operate based on commands from the controller;
identifying, by the first device, second performance metrics associated with communications between a second device and the set of hardware that implements the plurality of containers;
participating, by the first device, in a first election procedure with at least the second device, wherein the first election procedure includes selecting the first device based on a comparison of the first and second performance metrics;
determining, by the first device, that the controller has become unavailable;
based on determining that the controller has become unavailable and further based on the selection of the first device in the first election procedure, assuming control of operations of the controller, including issuing commands to the one or more workers;
determining that a quantity of backup containers associated with the controller is fewer than a quorum threshold quantity after the controller becomes unavailable;
based on determining that the quantity of backup containers is fewer than the quorum threshold quantity, instantiating a new backup container at the set of hardware that implements the plurality of containers; and
participating in a second election procedure in which the new backup container is selected to assume control of operations of the first device, including issuing commands to the one or more worker nodes.

16. The method of claim 15, wherein the first election procedure is performed prior to the determination that the controller has become unavailable.

17. The method of claim 15, wherein the first election procedure is performed after the determination that the controller has become unavailable.

18. The method of claim 15, wherein the first and second devices communicate with the one or more workers via a particular network and the controller communicates with the one or more workers without using the particular network.

19. The method of claim 15, wherein the first performance metrics include a first measure of latency between the first device and the one or more workers and the second performance metrics include a second measure of latency between the second device and the one or more workers.

20. The method of claim 15, wherein the set of hardware that implements the plurality of containers is a first set of hardware, wherein at least one of the first device or the second device is implemented by a second set of hardware that is connected to the first set of hardware via a network.

* * * * *